(12) United States Patent
Nirmalraj

(10) Patent No.: US 10,611,135 B2
(45) Date of Patent: Apr. 7, 2020

(54) DEVICE FOR POSITIONING OF MOLECULES

(71) Applicant: International Business Machines Corporation, Armonk, NY (US)

(72) Inventor: Pio Peter N. Nirmalraj, Adliswil (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 337 days.

(21) Appl. No.: 15/459,625

(22) Filed: Mar. 15, 2017

(65) Prior Publication Data

US 2018/0264461 A1  Sep. 20, 2018

(51) Int. Cl.
| | |
|---|---|
| *G01N 27/453* | (2006.01) |
| *B32B 38/10* | (2006.01) |
| *B82B 3/00* | (2006.01) |
| *B03C 5/00* | (2006.01) |
| *B05D 3/14* | (2006.01) |
| *B05D 1/06* | (2006.01) |

(52) U.S. Cl.
CPC .............. *B32B 38/10* (2013.01); *B03C 5/005* (2013.01); *B82B 3/0004* (2013.01); *G01N 27/453* (2013.01); *B05D 1/06* (2013.01); *B05D 3/14* (2013.01)

(58) Field of Classification Search
CPC .... B03C 5/005; G01N 27/447; G01N 27/453; H04L 41/0886
See application file for complete search history.

(56) References Cited

U.S. PATENT DOCUMENTS

| | | | |
|---|---|---|---|
| 4,987,312 A | 1/1991 | Eigler | |
| 7,524,408 B2 | 4/2009 | Monbouquette et al. | |
| 7,619,403 B2 | 11/2009 | Kashida | |
| 7,815,871 B2 | 10/2010 | Pamula et al. | |
| 2007/0246364 A1* | 10/2007 | Amlani | B03C 5/005 204/547 |
| 2010/0140582 A1* | 6/2010 | Nessel | H01L 45/00 257/4 |
| 2011/0107822 A1 | 5/2011 | Bunner et al. | |
| 2014/0130972 A1 | 5/2014 | Ren et al. | |
| 2015/0008123 A1* | 1/2015 | Cheng | B03C 5/02 204/450 |

(Continued)

OTHER PUBLICATIONS

Shunaev et al., "Phenomenon of current occurrence during the motion of a C60 fullerene on substrate-supported graphene," RSC Adv. 2015, 5, 86337-86346 (Year: 2015).*

(Continued)

*Primary Examiner* — Alexander S Noguerola
(74) *Attorney, Agent, or Firm* — Cantor Colburn LLP; Daniel Morris

(57) ABSTRACT

Embodiments of the present invention relate to a device comprising a platform comprising a layer of a 2-dimensional material. The device further comprises a plurality of electrodes and one or more molecules arranged on the platform. The device is configured to apply control signals to the plurality of electrodes to position the molecules by means of an electric field. Embodiments of the invention further concern a corresponding method for fabricating such a device and a method for positioning molecules by such a device.

10 Claims, 8 Drawing Sheets

(56) References Cited

U.S. PATENT DOCUMENTS

2015/0377824 A1* 12/2015 Ruhl .................... G01N 33/004
 204/424
2018/0264462 A1 9/2018 Nirmalraj et al.

OTHER PUBLICATIONS

Savin et al., "Transport of fullerene molecules along graphene nanoribbons," Scientific Reports, 2 : 2012, pp. 1-7 (Year: 2012).*

Chapter entitled Quantum Cellular Automata by Karoline Wiesner in the Encyclopedia of Complexity and Systems Science, Springer Science+Business Media New York 2013 (Year: 2013).*

Yadav et al., Structure, properties and applications of fullerenes, International Journal of Nanotechnology and Applications, vol. 2, No. 1 (2008), pp. 15-24 (Year: 2008).*

C. Sykes, "New methods for controlling molecular motion on surfaces", National Science Foundation, Award Abstract #1412402, https://www.nstgov/awardsearch/showAward?AWD_ID=1412402 (retrieved Feb. 27, 2017), 2 pages.

Gao et al., "Guided self-assembly of molecular dipoles on a substrate surface", Journal of Applied Physics, vol. 93, No. 7, Apr. 1, 2003, pp. 4276-4282.

Shirai et al., "Directional Control in Thermally Driven Single-Molecule Nanocars", Nano Lett., 2005, 5 (11), pp. 2330-2334.

Stroscio et al., "Atomic and Molecular Manipulation with the Scanning Tunneling Microscope", Science, vol. 254, Issue 5036, Nov. 29, 1991, pp. 1319-1326.

Suo et al., "Programmable motion and patterning of molecules on solid surfaces", PNAS 2004 101 (21), May 2004, pp. 7874-7879.

List of IBM Patents or Patent Applications Treated as Related; Date Filed: Mar. 15, 2017, 2 pages.

Nirmalraj et al., "Device for Positioning of Molecules," U.S. Appl. No. 15/802,527, filed Nov. 3, 2017.

List of IBM Patents or Patent Applications Treated As Related; Date Filed: Nov. 25, 2019, 2 pages.

Nirmalraj et al., "Device for Positioning of Molecules," U.S. Appl. No. 16/693,799, filed Nov. 25 2019.

Tabassian et al., "Graphene-coated meshes for electroactive flow control devices utilizing two antagonistic functions of repellency and permeability". Nature Communication. Oct. 31, 2016. 9p.

* cited by examiner

DEVICE FOR POSITIONING OF MOLECULES

BACKGROUND

The invention relates to a device for the positioning of molecules.

One known approach to move nanoscale molecules and atoms on surfaces is to use a Scanning Tunneling Microscopes (STM) or an Atomic Force Microscope (AFM). According to this approach one molecule at a time is moved using a local scanning probe tip induced electric field. While this is an effective method to direct molecular motion on surfaces, it is a serial process that is hardly scalable. Currently nanoscale car races are conducted using an STM induced tip.

Nanoscale molecules that tend to self-assemble can be coerced in forming patterns through directed self-assembly with surface patterning. However, such directed self-assembly results in static structures having a rigid architecture.

SUMMARY

According to aspects of the present invention, embodiments of the invention are directed to a device comprising a platform, the platform comprising a layer of a 2-dimensional material. The device further comprises a plurality of electrodes and one or more molecules arranged on the platform. The device is configured to apply control signals to the plurality of electrodes to position the one or more molecules by means of an electric field.

According to aspects of the invention, embodiments of the invention are directed to a method for fabricating a device for the positioning of molecules. The method comprises providing a metal foil, growing a layer of a 2-dimensional material on the metal foil, providing a semiconductor substrate, fabricating a plurality of electrodes, transferring the layer of the 2-dimensional material and depositing one or more molecules on the layer of the 2-dimensional material.

According to aspects of the invention, embodiments of the invention are directed to a method for positioning molecules by a device according to the first aspect. The method comprises applying a first set of control signals to a plurality of electrodes to position the plurality of molecules in a first molecule arrangement and applying a second set of control signals to the plurality of electrodes to position the plurality of molecules in a second molecule arrangement. The second set of control signals is different from the first set of control signals. The device provides a first functionality in the first molecule arrangement and a second functionality in the second molecule arrangement.

Devices and methods embodying the present invention will now be described, by way of non-limiting examples, and in reference to the accompanying drawings. Technical features depicted in the drawings are not necessarily to scale. Also some parts may be depicted as being not in contact to ease the understanding of the drawings, whereas they may very well be meant to be in contact, in operation.

DETAILED DESCRIPTION

In reference to FIGS. 1-9, general aspects of the invention and corresponding terms are first described.

The invention relates to a device for positioning molecules on a platform comprising a layer of a 2-dimensional material. 2-dimensional materials, also denoted as 2D materials, may be defined as a class of materials, more particularly a class of nanomaterials, defined by their property of being merely one or two atoms thick. One popular example of a 2-dimensional material is graphene, a material constituted by a single layer of carbon atoms arranged in a hexagonal crystal lattice. 2-dimensional materials are considered to have many interesting applications in particular for future semiconductor technologies.

Devices and methods according to embodiments of the invention can be realized with a wide range of 2D materials. According to embodiments graphene, transition metal dichalcogenide (TMD), single layer molybdenum disulfide ($MoS_2$); tungsten disulfide ($WS_2$); tungsten diselenide ($WSe_2$) and boron nitride (BN) may be used as 2-dimensional material. Also a wide range of molecules may be used. According to embodiments the molecules may range from pentacene, phthalocyanines to fullerenes and ruberenes and derivatives thereof.

Embodiments of the invention allows controlling a plurality of molecules at a given instant using an electric field applied by means of the electrodes arranged below and/or around the platform.

Devices according to embodiments of the invention may facilitate the programming of molecular motion and reconfigurable patterns of the molecules. Each molecule carries a certain electric dipole moment which can respond to an externally applied electric field. Depending on the voltages applied to the plurality of electrodes the molecules can be made to move in a certain direction, made to aggregate, maintain coherence, create de-centering effects, form shapes and patterns and convert a pattern to another pattern. Furthermore, reconfigurable programming can be achieved by alternating or changing the electric fields applied through the electrodes.

According to embodiments the positioning and movement of the molecules can be implemented by a parallel process. Furthermore, according to embodiments such programming of molecular motion on 2D-materials presents a novel route to control organic electronics based on 2-dimensional materials and in programmable self-assembly. Furthermore, embodiments of the invention may be used for controllable positioning/placement of single molecules at nanogap electrodes.

Figure 1:
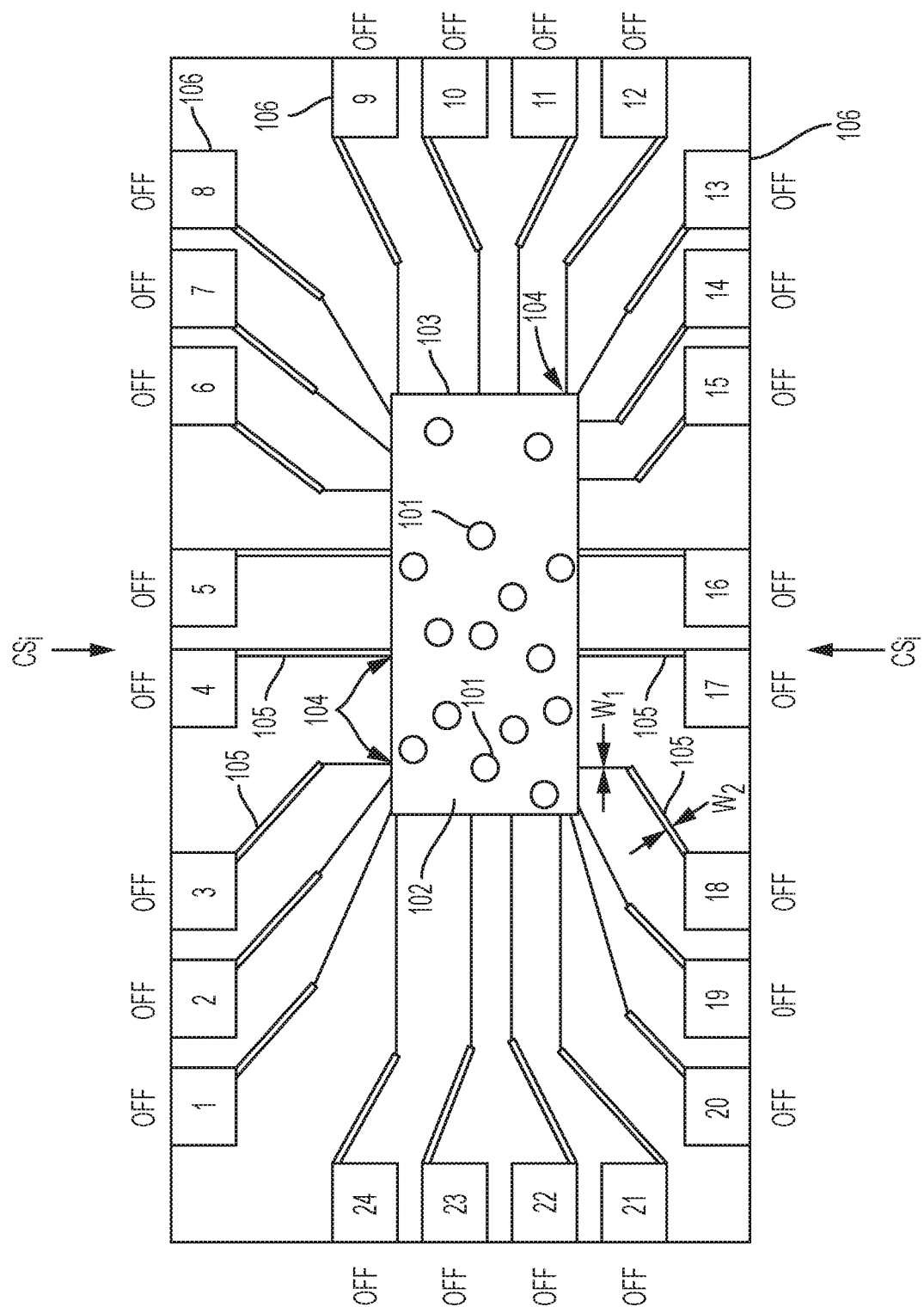
FIG. 1 shows a top view on a device for the positioning of molecules in an off-state.

FIG. 1 shows a top view on a device 100 for the positioning of molecules 101 in a plurality of reconfigurable molecule arrangements. The device 100 comprises a platform 102 comprising a layer 103 of a 2-dimensional material. The device 100 further comprises a plurality of electrodes 104 which are arranged around the platform 102. The plurality of molecules 101 are adsorbed on the platform 102 by adsorptive forces between the molecules 101 and the layer 103 of the 2-dimensional material. The device 100 further comprises a plurality of electrode leads 105 and a plurality of contacts pads 106. The electrodes 104, the electrode leads 105 and the contact pads 106 are electrically conductive. The contact pads 106 are configured to receive control signals $CS_i$, from a controller. The electrode leads 105 are configured to transmit the control signals $CS_i$, from the contact pads 106 to the plurality of electrodes 104. As a result, the device 100 can apply the control signals $CS_i$, to the electrodes 104 and thereby apply an electrical field E of configurable strength and form in order to position the molecules 101 by the electrical field E.

Figure 2:
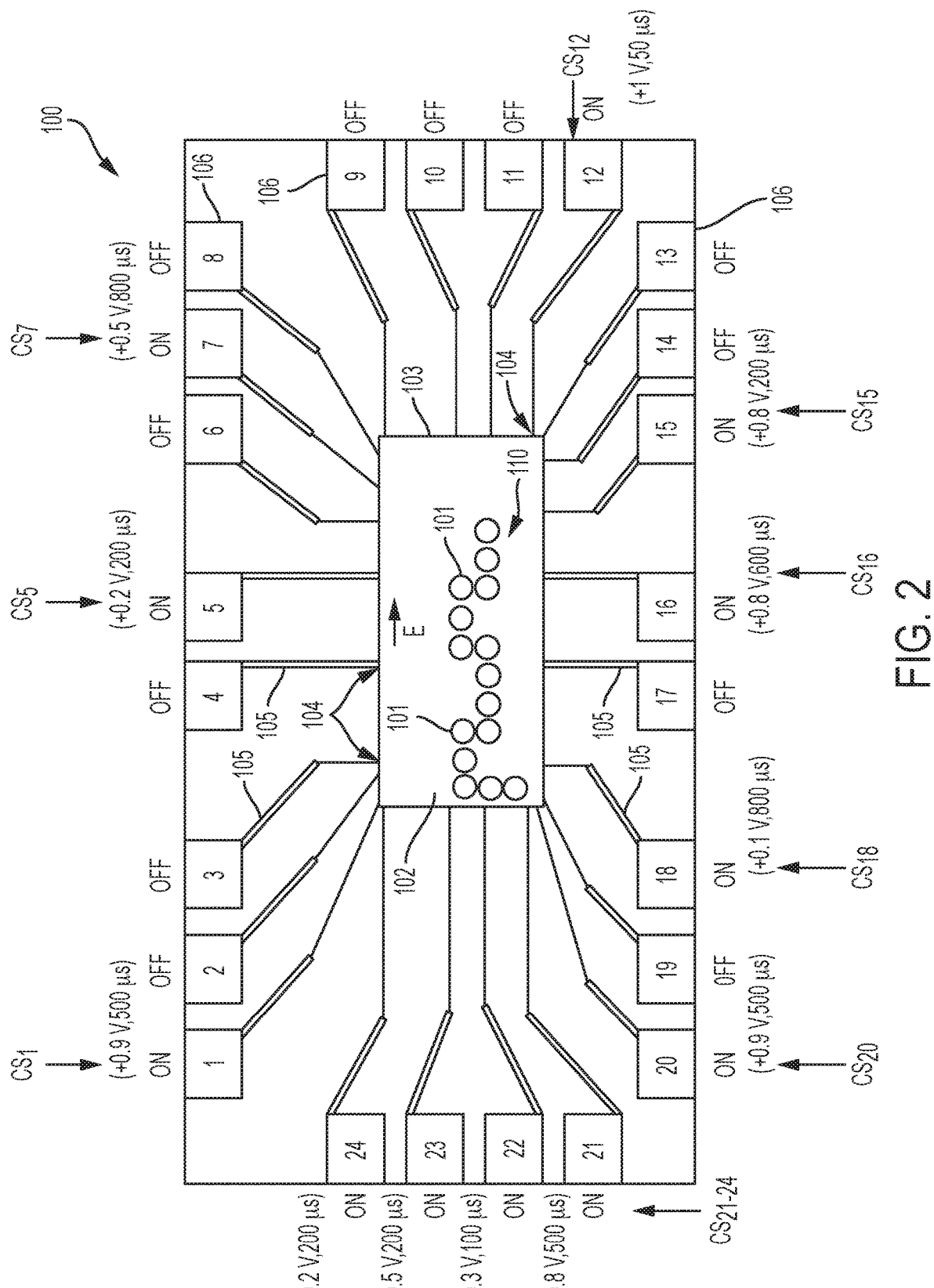
FIG. 2 shows another top view on the device of FIG. 1 in an on-state in which a set of control signals is applied in order to position the molecules in a predefined molecule arrangement.

The electrode leads 105 may have different width w or different sizes of cross sections. This is illustrated in FIGS. 1 and 2 by thicker and thinner lines respectively. The width $w_i$ of the electrode leads 105 can be smaller in the vicinity/adjacent to the platform 102 than the width $w_2$ in the vicinity/adjacent to the contact pads 106. Thereby small electrodes 104 can be realized. According to embodiments the smaller parts of the electrode leads 105 represented by thinner lines may be fabricated by electron beam lithography, while the bigger parts of the electrode leads 105 represented by thicker lines may be fabricated by UV-lithography.

More particularly, the device 100 comprises twenty-four contact pads 106 which are labelled with corresponding numerals 1-24. Accordingly, the device 100 comprises twenty-four electrode leads 105 and twenty-four electrodes 104. The contact pads 106, the electrode leads 105 and the electrodes 104 are arranged around the platform 102. The electrodes 104 are directly attached to the platform 102 in order to apply the control signals $CS_i$, and the resulting electrical field E on the molecules 101 arranged on the platform 102.

The electrode leads 105 and the electrodes 104 may be in particular formed by electron beam lithography. This facilitates the fabrication of very small structures and thin structures. On the contrary, the electrode pads 106 may be formed by ultra violet (UV)-lithography. The electrodes 104 can include titanium, gold and/or palladium.

The 2-dimensional material of the layer 103 may be e.g. graphene, transition metal dichalcogenide, $MoS_2$, $WS_2$ $WSe_2$ or BN. According to some embodiments, the molecules 101 may be pentacene-molecules or derivatives thereof. According to other embodiments, the molecules 101 may be phthalocyanine molecules or derivatives thereof, fullerene molecules or derivatives thereof or ruberene molecules or derivatives thereof.

The molecules 101 may by generally embodied by any electron acceptor or electron donator molecule. The size of the molecules 101 can be greater than 1 nm.

The molecules 101 are kept by adhesion forces on the layer 103 of the 2-dimensional material. The adhesion forces between the layer 103 and the molecules 1010 are predominantly van der Waals forces according to embodiments.

Each molecule 101 carries a certain electric dipole moment which can respond to an externally applied electric field.

According to some embodiments, the device 100 may be configured as molecular quantum cellular automaton. Hence according to embodiments the device 100 may be applied in cell patterning in high density molecular quantum cellular automata to controlling molecular dopant density in 2D material based high speed transistors.

FIG. 1 illustrates the device 100 in an off-state in which the control signals $CS_i$, are switched off. In other words, no control signals are applied to the device 100. As a result, the molecules 101 have arranged in a self-assembled form on the platform 102.

According to embodiments the distance between the electrodes 104 and the molecules 101 or group of molecules 101 is between 10 nm and 50 nm.

FIG. 2 shows another top view on the device 100 for the positioning of molecules 101. More particularly, FIG. 2 illustrates the device 100 in an on-state in which a set of control signals Csi is applied to the contact pads 106 and the electrodes 104 in order to position the molecules 101 in a predefined molecule arrangement. As a result, the molecules 101 have arranged in a predefined first molecule arrangement 110. As illustrated in FIG. 2, different control signals $CS_i$, are applied to the respective electrodes 104. Furthermore, also according to this embodiment some of the electrodes 104 are still switched off. In this example, the electrodes 2, 3, 4, 6, 8, 9, 10, 11, 13, 14, 17, and 19 are switched off, while the electrodes 1, 5, 7, 12, 15, 16, 18, 20, 21, 22, 23 and 24 are switched on and receive corresponding control signals $CS_1$, $CS_5$, $CS_7$, $CS_{12}$, $CS_{15}$, $CS_{16}$, $CS_{18}$, $CS_{20}$, CS21, $CS_{22}$, $CS_{23}$ and $CS_{24}$.

The control signals $CS_i$, can be embodied as voltage signals and hence electrical voltage signals $V_i$, are applied to the respective electrodes 104. The electrical voltage signals $V_i$, can be embodied as voltage pulses having different pulse width and pulse amplitudes. This allows to position the molecules in a broad variety of molecule arrangements.

Exemplary values of the voltage signals $V_i$, are given in FIG. 2 adjacent to the respective contact pad. As an example, the electrode 20 receives a voltage pulse of 0.9 V with a pulse length of 500 µs. As a further example, the electrode 16 receives a voltage pulse of 0.8 V with a pulse length of 600 µs. And as another example, the electrode 5 receives a voltage pulse of 0.2 V with a pulse length of 200 µs.

The position of the plurality of molecules 101 is reconfigurable by changing the control signals $CS_i$, and $V_i$, respectively. Hence by applying a second set of control signals that is different from the set as illustrated in FIG. 2, the molecules 101 may be positioned in another second molecule arrangement that is different from the first molecule arrangement 110.

Accordingly, depending on the voltages $V_i$, applied on the electrodes 104, the molecules 101 can be made to move in a certain direction, made to aggregate, maintain coherence, create de-centering effects, form shapes and patterns and convert a pattern to another pattern.

According to embodiments, the device 100 may provide a first functionality with the first molecule arrangement 110. By changing the molecule arrangement with another set of control signals $CS_i$, a further functionality of the device 100 may be provided.

As illustrated in FIGS. 1 and 2, by applying the control signals $CS_i$ or $V_i$, one may direct the molecular motion of the molecules 101 in a desired way. The directed motion of the molecules 101 can then be tuned to create shapes or patterns as desired. Hence the device 100 allows reconfigurable molecule patterns and a controlled positioning of the molecules 101. The desired position can be confirmed using high-resolution ellipsometry, atomic force microscopy and/or scanning tunneling microscopy. According to embodiments the device 100 may be trained till a desired molecular pattern is achieved. In other words, the device 100 may use a plurality of control signal patterns to find an optimal pattern for the respective desired molecule pattern.

Figure 3:
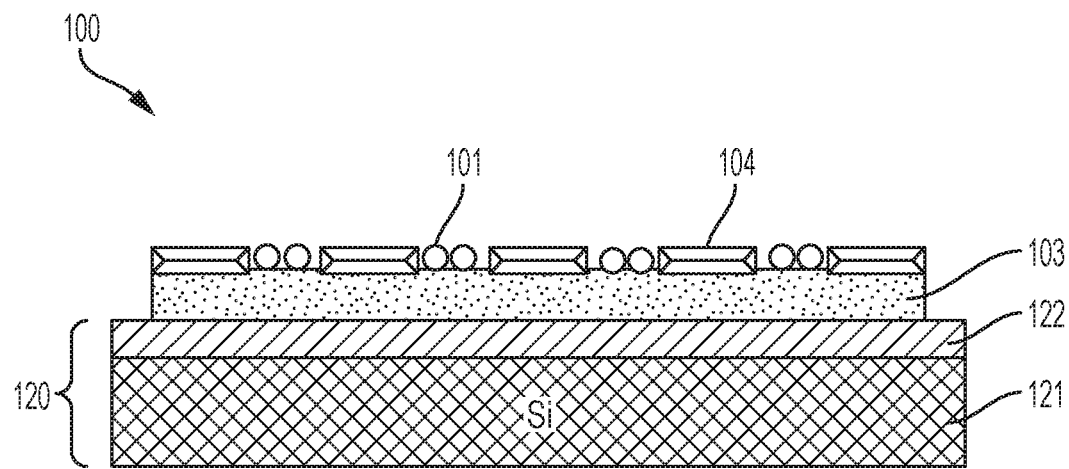
FIG. 3 shows a schematic and simplified cross sectional view/side view of the device of FIGS. 1 and 2.

FIG. 3 shows a cross sectional view of the device 100. The device 100 comprises a semiconductor substrate 120. The semiconductor substrate 120 can be embodied as SOI substrate. According to embodiments it comprises a semiconductor layer 121 of e.g. Silicon and an insulating layer 122, e.g. a $SiO_2$-layer. The layer 103 of the 2-dimensional material is arranged on the insulating layer 122. The electrodes 104 are arranged on the layer 103 of the 2-dimensional material. The layer 103 of the 2-dimensional material forms the platform 102 that carries the molecules 101. More particularly, the electrodes 104 are arranged around the platform 102 and the molecules 101 are arranged at the level of the electrodes 104.

Figure 4:
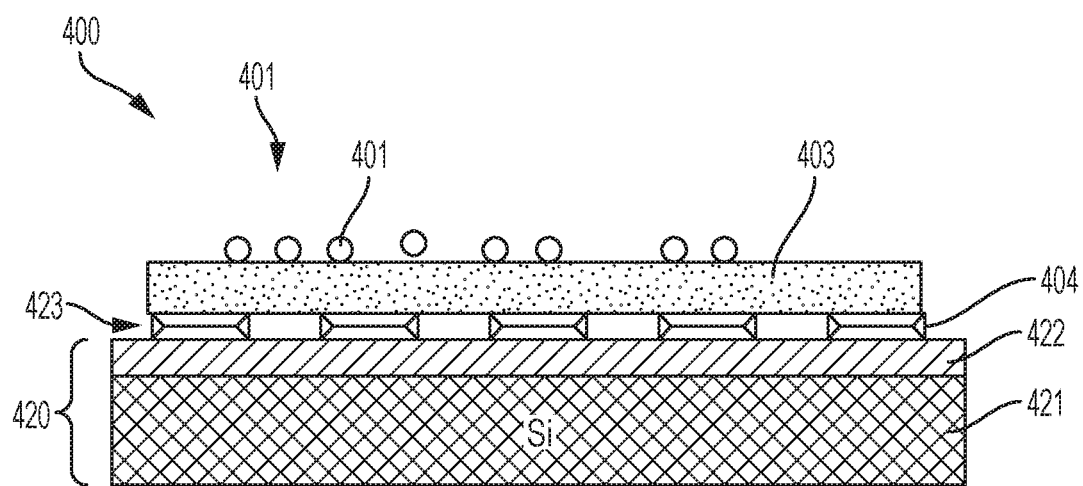
FIG. 4 shows a simplified and schematic cross sectional view of a device according to another embodiment of the invention having buried electrodes.

FIG. 4 shows a cross sectional view of a device 400 according to another embodiment of the invention. The device 400 comprises a semiconductor substrate 420 comprising a semiconductor layer 421 and an insulating layer 422. Electrodes 404 are arranged on the insulating layer 422 and form an electrode layer 423. A layer 403 of a 2-dimensional material is arranged on the electrode layer 423. The layer 403 of the 2-dimensional material forms a platform 402 that carries molecules 401.

According to this embodiment the electrodes 404 are implemented as buried electrodes below the platform 402.

Figure 5:
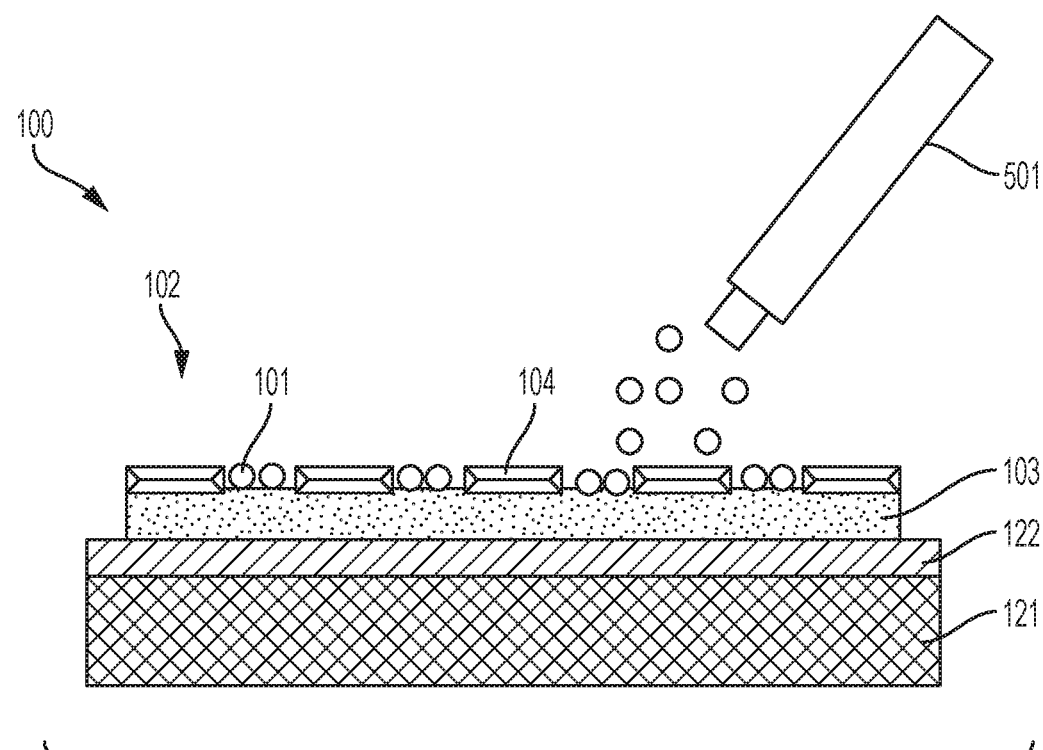
FIG. 5 shows a cross sectional view/side view of the device of FIG. 3 illustrating the deposition of the molecules by means of a spray gun.

FIG. 5 shows a cross sectional view of the device 100 illustrating the deposition of the molecules 101 by means of a spray gun 501. The spray gun 501 can be used for spraying a solution comprising the plurality of molecules 101 on the layer 103 of the 2-dimensional material. The molar concentration of the plurality of molecules 101 in the solution can be less than 0.01 mol/L.

The spray gun has nozzles and a feed for filling in a liquid solution. The spray gun 501 is configured to receive a compressed gas (e.g. $N_2$, Ar) from a compressor (not shown). The spray gun 501 can be operated under a ventilated fume cupboard in order to ensure consistent ambient conditions during the spray deposition. Upon activation of the spray gun 501, the liquid solution comprising the molecules in a solubilized form is sprayed by the compressed gas through the nozzles on the platform 102. The nozzles of the spray gun are chosen sufficiently small, e.g. 0.1 mm, to obtain a fine spray. The spray deposition is performed at an appropriate gas (Nitrogen/Argon) pressure of e.g. 2 mbar. The spray gun is held at an oblique angle from the surface of the layer 103 of the 2-dimensional material. The distance between the spray nozzle and the layer 103 of the 2-dimensional material should be appropriately chosen for achieving a fine coating of the solution comprising the molecules 101 on the platform 102. The distance can be about 5 cm to 10 cm. The entire spray deposition can be performed under a ventilated fume cupboard.

Figure 6:
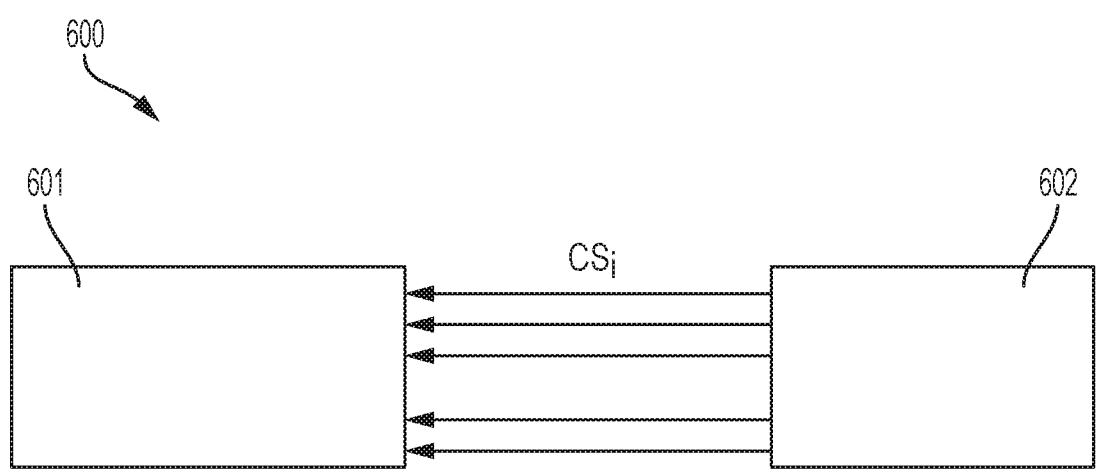
FIG. 6 shows a system comprising a device for the positioning of molecules and a controller for providing control signals to electrodes of the device.

FIG. 6 shows a system 600 comprising a device 601 for the positioning of molecules and a controller 602 for providing control signals CSi to electrodes of the device 601. The device 601 may be embodied e.g. as the device 100 as described with reference to FIGS. 1-3 or the device 400 as described with reference to FIG. 4.

FIGS. 7a to 7f illustrate various assembly levels of method operations of a method 700 for fabricating a device for the positioning of molecules. More particularly, the method 700 illustrates method operations for fabricating a device with buried electrodes as shown in FIG. 4.

Figure 7A:
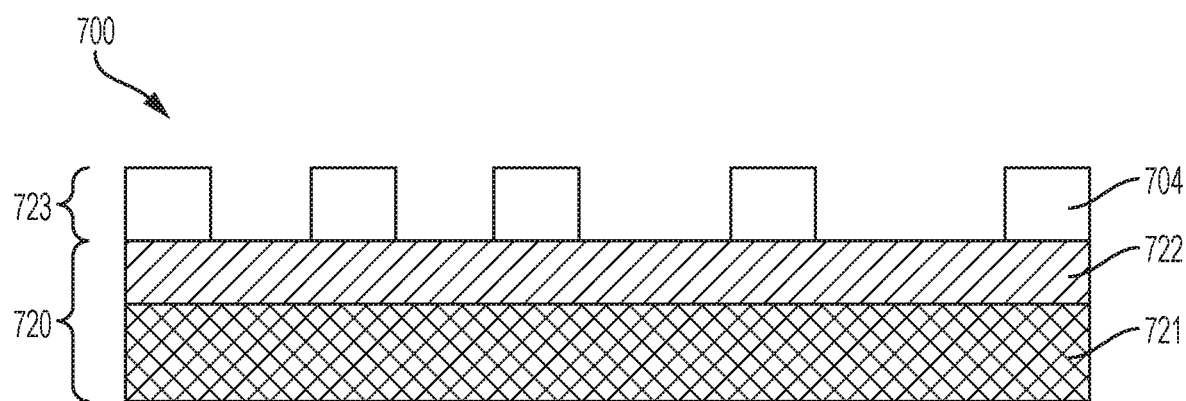
FIGS. 7a to 7f illustrate various assembly levels of method operations of a method for fabricating a device for the positioning of molecules.

FIG. 7a shows a semiconductor substrate 720. The semiconductor substrate 720 is embodied as SOI substrate and comprises a silicon layer 721 and an insulating layer 722 of $SiO_2$. On the insulating layer 722 there have been provided a plurality of electrodes 704. The plurality of electrodes 704 may have been fabricated by standard lithography techniques, in particular electron beam lithography, in order to reach small structures. The plurality of electrodes 704 form an electrode layer 723. According to embodiments the electrodes have a width of less than 100 nm and according to embodiments the electrodes have a width of less than 50 nm. The electrodes may be formed in particular by gold, palladium or platinum.

Figure 7B:
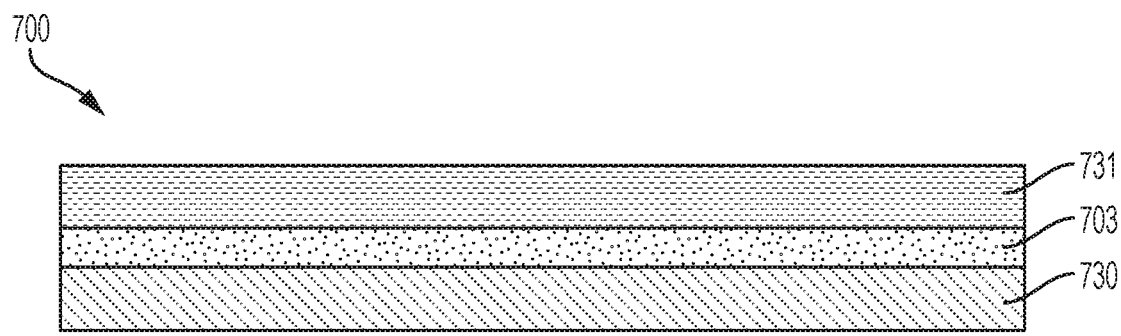

FIG. 7b shows an arrangement comprising a metal foil 730. On the metal foil 730 a layer 703 of a 2-dimensional material has been grown, e.g. a layer of $MoS_2$. The layer 703 may be grown e.g. by chemical vapor deposition (CVD) techniques. The metal foil 730 may be e.g. a copper foil.

On the layer 703 of the 2-dimensional material a transfer layer 731 has been provided. The transfer layer 703 may be in particular a polymer layer. According to embodiments the transfer layer 703 may comprise Polydimethylsiloxan (PDMS) or it may consist of PDMS. The transfer layer 731 is used for a PDMS based transfer of the 2-dimensional material to a semiconductor substrate.

Figure 7C:
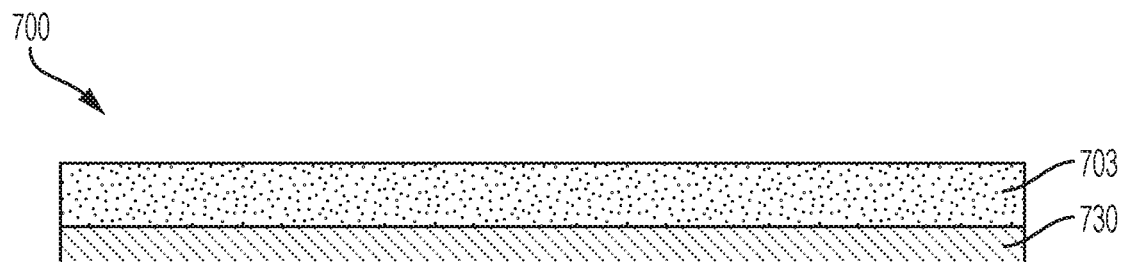

FIG. 7c shows the arrangement according to FIG. 7b without the metal foil 730. More particularly, the transfer layer 731 and the layer 703 of the 2-dimensional material have been stripped off the metal foil 730. This may be done e.g. by polymer assisted lift off.

Figure 7D:
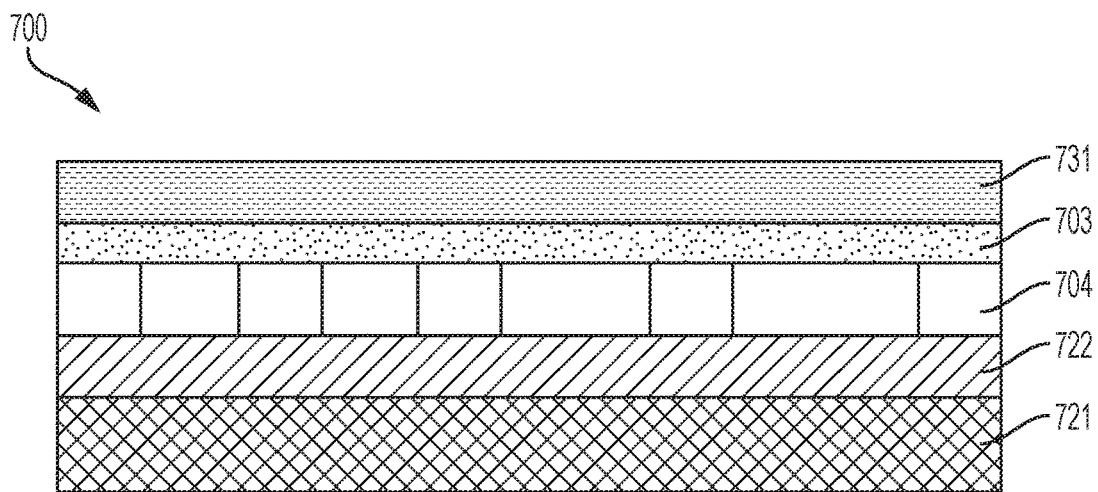

FIG. 7d shows an arrangement according to which the transfer layer 731 and the layer 703 of the 2-dimensional material have been deposited on or have been attached to the electrode layer 722.

Figure 7E:
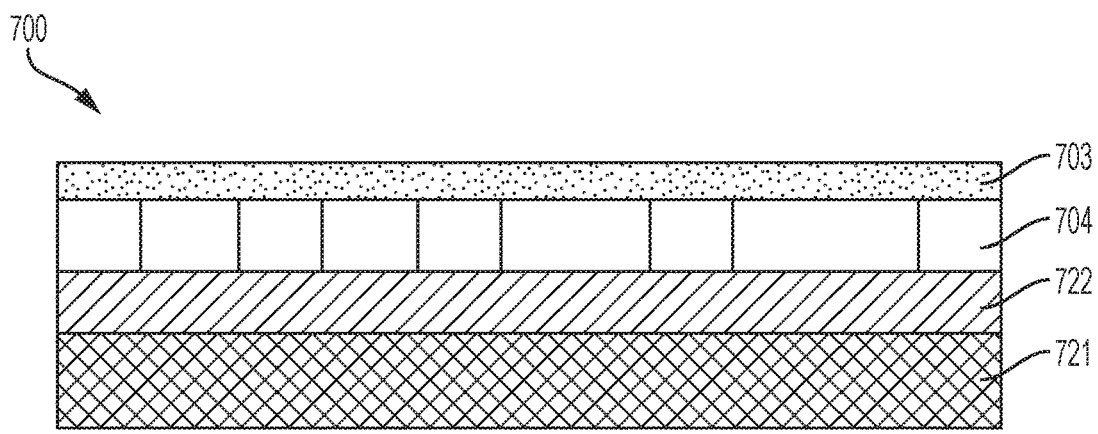

FIG. 7e shows an arrangement according to which the transfer layer 731 has been removed.

Figure 7F:
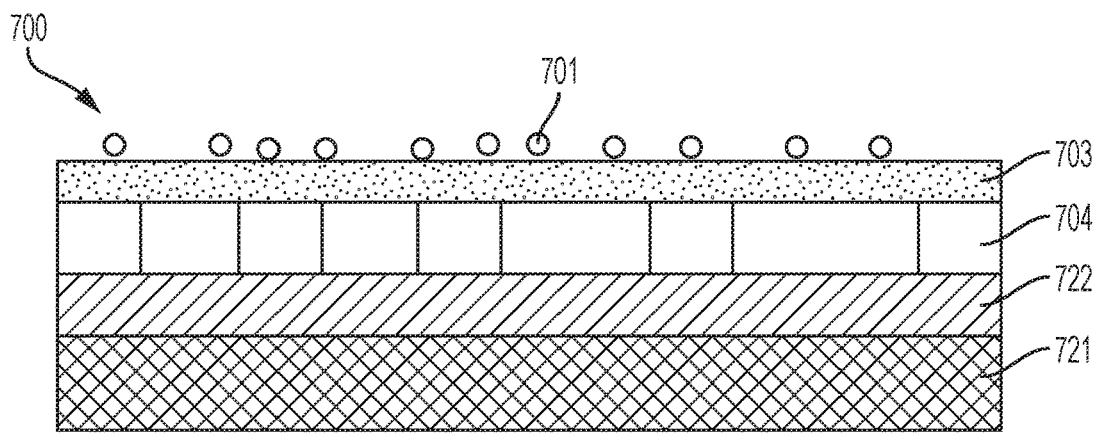

FIG. 7f shows an arrangement according to which a plurality of molecules 701 have been deposited on the layer 703 of the 2-dimensional material. According to embodiments the deposition can be performed by spraying a solution comprising the plurality of molecules 701 on the 2-dimensional material layer 703. According to embodiments the molar concentration of the plurality of molecules in the solution is less than 0.01 mol/L.

Figure 8:
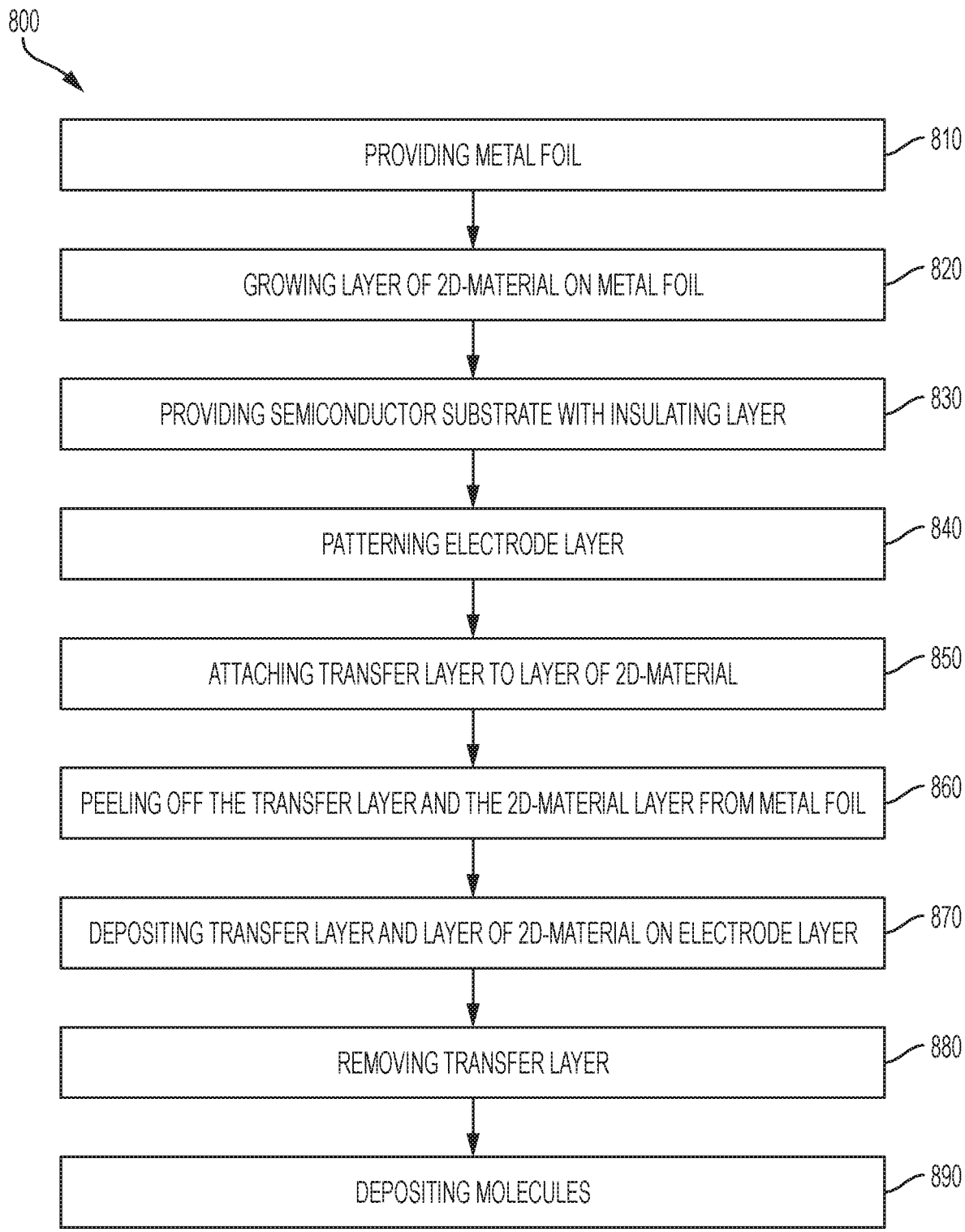
FIG. 8 shows a flow chart of method operations of method for fabricating a device for the positioning of molecules, wherein the device comprises buried electrodes as shown in FIG. 4.

FIG. 8 shows a flow chart 800 of method operations of method for fabricating a device for the positioning of molecules. More particularly, the flow chart 800 illustrates method operations for fabricating a device with buried electrodes as shown in FIG. 4.

At a operation 810, a metal foil is provided, e.g. the metal foil 730 of FIG. 7b.

At a operation 820, a layer of a 2D-material is grown on the metal foil, e.g. the layer 703 of FIG. 7b.

At a operation 830, a semiconductor substrate is provided, e.g. the substrate 720 of FIG. 7a.

At a operation 840, an electrode layer is patterned on the semiconductor substrate, e.g. the electrode layer 723 of FIG. 7a.

At a operation 850, a transfer layer is attached to the layer of the 2D-material, e.g. the transfer layer 731 to the layer 703 of FIG. 7b.

At a operation 860, the transfer layer 731 and the layer 703 of the 2-dimensional material are peeled off the metal foil 730.

At a operation 870, the transfer layer 731 and the layer 703 of the 2-dimensional material are deposited on the electrode layer 723.

At a operation 880, the transfer layer 731 is removed.

At a operation 885, the electrode layer 723 and the layer 703 of the 2-dimensional material are annealed. More particularly, the structure as shown in FIG. 7e is annealed. The annealing enhances the electrical contact between the buried electrodes 704 and the 2-dimensional material layer 703. Furthermore, the annealing removes adsorbates, e.g. hydrocarbon adsorbates, from the 2-dimensional material layer 703.

According to embodiments, the 2-dimensional material is embodied as $MoS_2$ and the $MoS_2$-buried electrode-Si system is annealed at 50-80 degrees for 25-35 mins. The annealing enhances the metal-MoS2 electrical contact and removes hydrocarbon adsorbates from the $MoS_2$ surface layer.

At a operation 890, a plurality of molecules, e.g. the molecules 701 of FIG. 7f, are deposited on the layer 703 of the 2-dimensional material. According to embodiments the deposition may be performed by spraying a liquid solution comprising the plurality of molecules 701 solubilized in a solvent on the 2-dimensional material layer 703.

Figure 9:
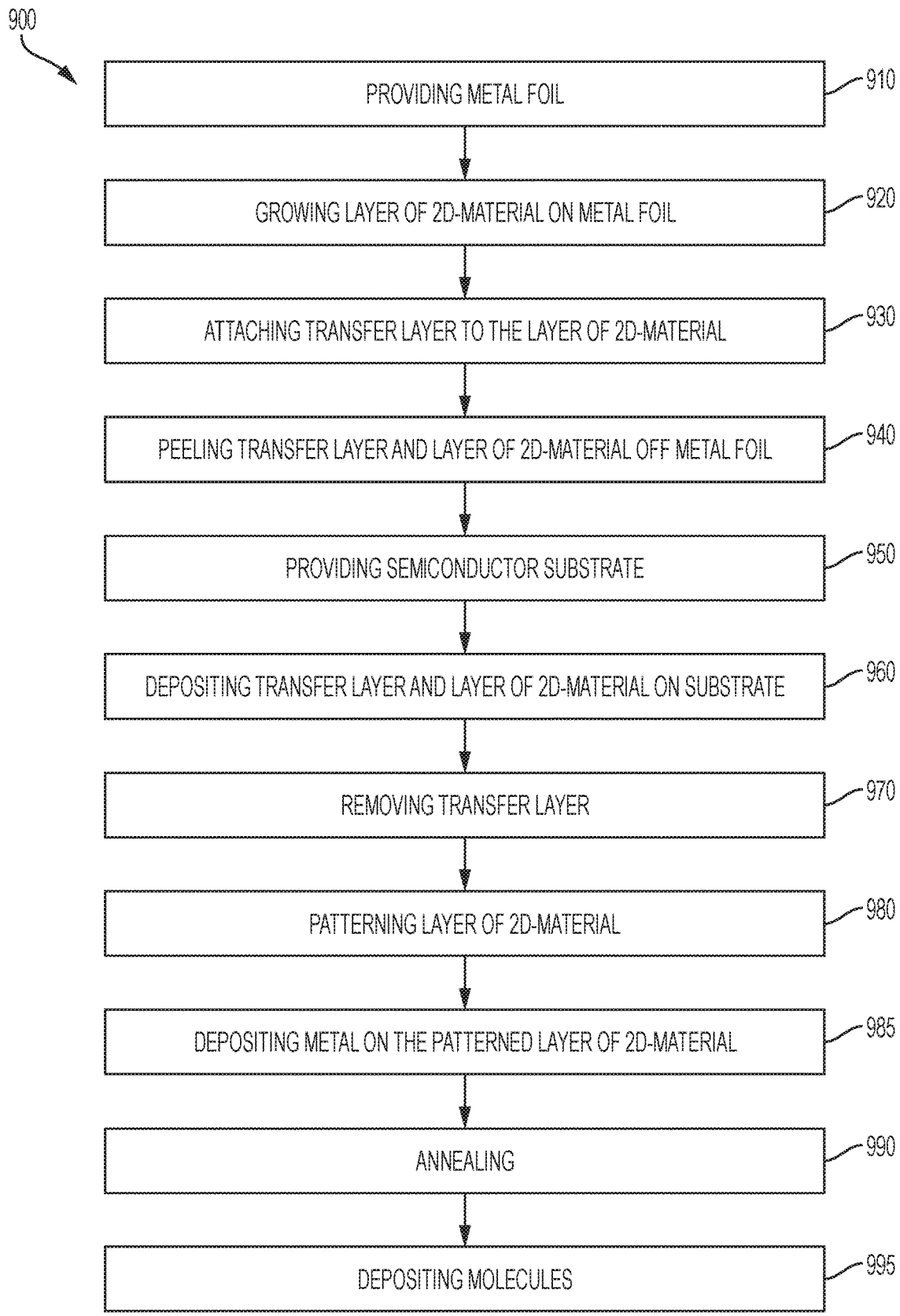
FIG. 9 shows a flow chart of method operations of method for fabricating a device for the positioning of molecules, wherein the device comprises non-buried electrodes as shown in FIGS. 1-3.

FIG. 9 shows a flow chart 900 of method operations of method for fabricating a device for the positioning of molecules. More particularly, the flow chart 900 illustrates method operations for fabricating a device with non-buried electrodes that are arranged around the platform at the level of the platform as shown in FIGS. 1-3.

At a operation 910, a metal foil is provided.

At a operation 920, a layer of a 2-dimensional material is grown on the metal foil.

At a operation 930, a transfer layer is attached to the 2-dimensional material.

At a operation 940, the transfer layer and the layer of the 2-dimensional material are peeled off/removed from the metal foil.

At a operation 950, a semiconductor substrate is provided.

At a operation 960, the transfer layer and the layer of the 2-dimensional material are deposited on the substrate.

At a operation 970, the transfer layer is removed or in other words sacrificed. This can be done e.g. by dissolution and additional annealing to remove excess polymers of the transfer layer.

Accordingly, the 2-dimensional material has been transferred from the metal foil to the substrate by a polymer-assisted transfer process.

At a operation 980, the layer of the 2-dimensional material is patterned for the electrodes.

At a operation 985, a metal is deposited on the patterned layer of the 2-dimensional material to create the plurality of electrodes.

At a operation 990, the patterned layer of the 2-dimensional material and the electrodes are annealed. According to embodiments high temperature annealing may be used here, e.g. annealing at 300-400 degree Celsius for 3-7 minutes.

At a operation 995, the molecules that shall be positioned are deposited on the platform comprising the layer of the 2-dimensional material. More particularly, a solution comprising the plurality of molecules is sprayed with a spray gun on the 2-dimensional material layer. The molar concentration of the plurality of molecules in the solution can be less than 0.01 mol/L.

Such a spray deposition has the advantage to be readily scalable. But generally also other methods for depositing the molecules may be used, e.g. drop casting or dip coating.

The liquid solution comprising the molecules may be e.g. prepared as a stock solution of the molecules. This stock solution is then used as the solution that will be sprayed.

Afterwards the fabricated device is ready for use and the electrodes may be individually energized with time sequenced voltage patterns to reach a field strength that can move the molecules or groups of molecules. The field strength can be between 1 V/Å and 4 V/Å. In general, the larger the molecules or the group of molecules that shall be moved, the larger the field strength that should be used.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated.

What is claimed is:

1. A device comprising:
   a platform comprising a layer of a 2-dimensional material including transition metal dichalcogenide;
   a plurality of electrodes; and
   one or more molecules arranged on the platform;
   wherein:
   the device is configured to:
   apply control signals to the plurality of electrodes to position the one or more molecules by means of an electric field.

2. A device according to claim 1, wherein the position of the one or more molecules is reconfigurable by changing the control signals.

3. A device according to claim 1, wherein the molecules are selected from the group consisting of:
   pentacene and derivatives thereof;
   phthalocyanines and derivatives thereof;
   fullerenes and derivatives thereof; and
   ruberenes and derivatives thereof.

4. A device according to claim 1, wherein the plurality of electrodes is implemented as buried electrodes being arranged below the platform.

5. A device according to claim 1, wherein the plurality of electrodes are arranged around the platform.

6. A device according to claim 1, wherein the device comprises:
   a plurality of electrode leads; and
   a plurality of contact pads;

wherein the plurality of electrode leads are configured to transmit the control signals from the plurality of contact pads to the plurality of electrodes.

7. A device according to claim 6, wherein the plurality of electrode leads are formed by electron beam lithography.

8. A device according to claim 6, wherein the plurality of contact pads are formed by UV lithography.

9. A device according to claim 1, wherein the plurality of electrodes comprise or consist of titanium, gold and/or palladium.

10. A device according to claim 1, wherein the size of the one or more molecules is greater than 1 nm.

* * * * *